United States Patent [19]

Young

[11] 4,158,415

[45] Jun. 19, 1979

[54] REMOTE ACCESS MANIPULATOR

[75] Inventor: Robert R. Young, Murrysville, Pa.

[73] Assignee: Westinghouse Electric Corp., Pittsburgh, Pa.

[21] Appl. No.: 868,001

[22] Filed: Jan. 9, 1978

[51] Int. Cl.² .................. B25J 3/04; G21C 19/32
[52] U.S. Cl. .................................. 414/2; 165/76; 414/732; 414/744; 294/96
[58] Field of Search .................. 214/1 R, 1 B, 1 BS, 214/1 BC, 1 BH, 1 BD, 1 BV, 1 CM, 18 N, 151; 294/86.24, 86.25, 94, 96; 176/29, 30, 31, 32; 165/76

[56] References Cited

U.S. PATENT DOCUMENTS

| 3,889,820 | 6/1975 | Ranger | 214/1 BB |
|---|---|---|---|
| 3,913,752 | 10/1975 | Ward | 214/1 BB |
| 3,934,731 | 1/1976 | Muller | 214/1 BB |
| 4,018,344 | 4/1977 | Leshem | 214/1 BB |
| 4,018,345 | 4/1977 | Formanek | 214/1 BB |
| 4,018,346 | 4/1977 | Leshem | 214/1 BB |

Primary Examiner—Francis S. Husar
Assistant Examiner—George F. Abraham
Attorney, Agent, or Firm—L. A. DePaul; Z. L. Dermer

[57] ABSTRACT

A remote access manipulator comprises a locking mechanism capable of self-alignment for performing operations on equipment located in areas where human access is limited. The manipulator further comprises a slave carriage located in the equipment on which the operation is to be performed, such as a nuclear steam generator, for carrying tools and inspection devices for performing operations on the equipment together with a master carriage located in a scale model of the equipment and electrically connected to the slave carriage for controlling the movement of the slave carriage. The slave carriage is capable of advancing across a surface of the equipment to position the devices which it carries. The manipulator further comprises a slave manipulator arm used to move the slave carriage into and out of the equipment on which the operation is to be performed in conjunction with a master manipulator arm located in the scale model for controlling the movement of the slave manipulator arm. The locking mechanism comprises camlocks mounted on the slave carriage for engaging the equipment while being capable of self-alignment with respect to the equipment.

13 Claims, 13 Drawing Figures

REMOTE ACCESS MANIPULATOR

CROSS-REFERENCE TO RELATED APPLICATION

The invention described herein is related to copending applications Ser. No. 806,233, filed June 13, 1977, entitled "Remote Access Manipulator" by D. R. Riffe and Ser. No. 806,232, filed June 13, 1977, entitled "Remote Access Manipulator" by R. H. Sturgess, Jr.

BACKGROUND OF THE INVENTION

This invention relates to remote access manipulators and more particularly to remote access manipulators for inspecting and repairing nuclear steam generators.

There are many situations in which a hazardous environment limits human access to various locations. One such situation occurs in the inspection and repair of nuclear steam generators. A typical nuclear steam generator comprises a vertically oriented shell, a plurality of U-shaped tubes disposed in the shell so as to form a tube bundle, a tube sheet for supporting the tubes at the ends opposite the U-like curvature, and a dividing plate that cooperates with the tube sheet forming a primary fluid inlet plenum at one end of the tube bundle and a primary fluid outlet plenum at the other end of the tube bundle. The primary fluid having been heated by circulation through the nuclear reactor core enters the steam generator through the primary fluid inlet plenum. From the primary fluid inlet plenum, the primary fluid flows upwardly through first openings in the U-tubes near the tube sheet which supports the tubes, through the U-tube curvature, downwardly through second openings in the U-tubes near the tube sheet, and into the primary fluid outlet plenum. At the same time, a secondary fluid, known as feedwater, is circulated around the U-tubes in heat transfer relationship therewith thereby transferring heat from the primary fluid in the tubes to the secondary fluid surrounding the tubes causing a portion of the secondary fluid to be converted to steam. Since the primary fluid contains radioactive particles and is isolated from the secondary fluid by the U-tube walls and tube sheet, it is important that the U-tubes and tube sheet be maintained defect-free so that no breaks will occur in the U-tubes or in the welds between the U-tubes and the tube sheet thus preventing contamination of the secondary fluid by the primary fluid.

Occasionally it is necessary to either inspect or repair the U-tubes or tube sheet welds by way of access through the primary fluid inlet and outlet plena. For this purpose manways are provided in the vertical shell so that working personnel may enter the inlet and outlet plena to perform operations on the U-tubes and tube sheet. However, since the primary fluid which is generally water contains radioactive particles, the inlet and outlet plena become radioactive which thereby limits the time that working personnel may be present therein. Accordingly, it would be advantageous to be able to perform operations on the U-tubes and tube sheet without requiring the presence of working personnel. There are several mechanisms known in the art that attempt to provide a solution to this problem but none of them have been able to completely solve the problem.

In U.S. Pat. No. 3,913,452 to C. T. Ward et al., issued Oct. 21, 1975 and entitled "Remote Movable Platform" there is described a remotely movable carriage which serves as a mobile platform from which remotely initiated and controlled inspection and work operations might be performed on the tubes in a nuclear steam generator. The carriage includes a stepping mechanism which interacts with a member, such as a tube sheet, relative to which the carriage moves in generally parallel relationship. The stepping mechanism may employ selectively extensible fingers for lateral engagement with the openings in the members. In addition, an extension device may be employed for remotely handling the carriage through the manway during installation and removal. In monitoring the location of the carriage various techniques may be used such as television or, preferably, techniques which initially establish the location of the carriage relative to the tube sheet when first placed against the under surface of the tube sheet and which then plot and monitor the movement of the carriage across the tube sheet surface. While the patent to Ward et al. does describe one type of remote access device, it does not completely solve the problem of remote access operation on members such as tube sheets. For example, should there be a power loss during operation the plotting and monitoring mechanism may not be capable of reestablishing the location of the carriage. Furthermore, should a substantial number of tubes in one area be plugged by deposits, the Ward device might not be able to traverse the plugged area.

Another device for inspection a tube sheet is described in U.S. Pat. No. 4,004,698 to B. Gebelin issued Jan. 25, 1977 and entitled "Device For Positioning A Member On A Tubular Plate". The device comprises two perpendicular arms capable of relative motion for transporting the member along the tube sheet. While the two perpendicular arms are capable of movement along a rectangular coordinate array of tubes, difficulty would be encountered in avoiding large areas of plugged tubes.

SUMMARY OF THE INVENTION

A remote access manipulator comprises a locking mechanism capable of self-alignment for performing operations on equipment located in areas where human access is limited. The manipulator further comprises a slave carriage located in the equipment on which the operation is to be performed for carrying tools and inspection devices for performing operations on the equipment. Where the equipment is a tube sheet of a nuclear steam generator, the slave carriage is capable of inserting self-aligning camlocks into the openings in the tube sheet for supporting the slave carriage therefrom and for advancing the slave carriage across the tube sheet to thereby position tools in relationship to the openings in the tube sheet. A master carriage is located in a scale model of the equipment and electrically connected to the slave carriage for controlling the movement of the slave carriage such that manual manipulation of the master carriage is automatically translated into movement of the slave carriage. The manipulator further comprises a slave manipulator arm used to move the slave carriage into and out of the equipment on which the operation is to be performed in conjunction with a master manipulator arm located in the scale model for controlling the movement of the slave manipulator arm.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In a tube-type steam generator, a tube sheet supports a bundle of heat transfer tubes. The invention described herein provides a remote access manipulator for performing operations on equipment located in areas where human access is limited such as a tube sheet of a steam generator.

Figure 1:
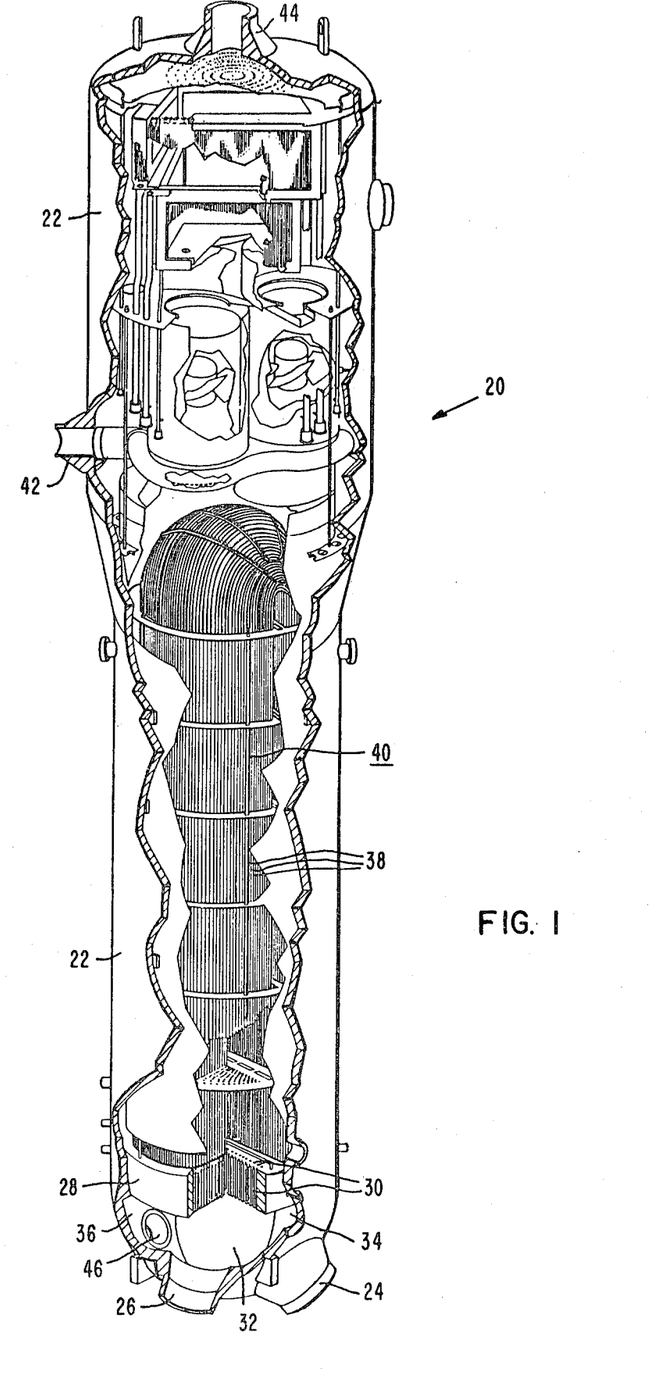
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tube sheet 28 having tube holes 30 therein is also attached to outer shell 22 near its lower end. A dividing plate 32 attached to both tube sheet 28 and outer shell 22 defines a primary fluid inlet plenum 34 and a primary fluid outlet plenum 36 in the lower end of the steam generator as is well understood in the art. Tubes 38 which are heat transfer tubes shaped with a U-like curvature are disposed within outer shell 22 and attached to tube sheet 28 by means of tube holes 30. Tubes 38 which may number about 7,000 form a tube bundle 40. In addition, a secondary fluid inlet nozzle 42 is disposed on outer shell 22 for providing a secondary fluid such as water while a steam outlet nozzle 44 is attached to the top of outer shell 22. In operation, the primary fluid which may be water having been heated by circulation through the nuclear reactor core enters steam generator 20 through primary fluid inlet nozzle 24 and flows into primary fluid inlet plenum 34. From primary fluid inlet plenum 34 the primary fluid flows upwardly through the tubes 38, in tube sheet 28, up through the U-shaped curvature of tubes 38, down through tubes 38 and into primary fluid outlet plenum 36 where the primary fluid exits the steam generator through primary fluid outlet nozzle 26. While flowing through tubes 38, heat is transferred from the primary fluid to the secondary fluid which surrounds tubes 38 causing the secondary fluid to vaporize. The resulting steam then exits the steam generator through steam outlet nozzle 44. On occasion, it is necessary to inspect or repair tubes 38 or the welds between tubes 38 and tube sheet 28 to assure that the primary fluid which may contain radioactive particles remains isolated from the secondary fluid. Therefore, manways 46 are provided in outer shell 22 to provide access to both primary fluid inlet plenum 34 and primary fluid outlet plenum 36 so that access may be had to the entire tube sheet 28.

Figure 2:
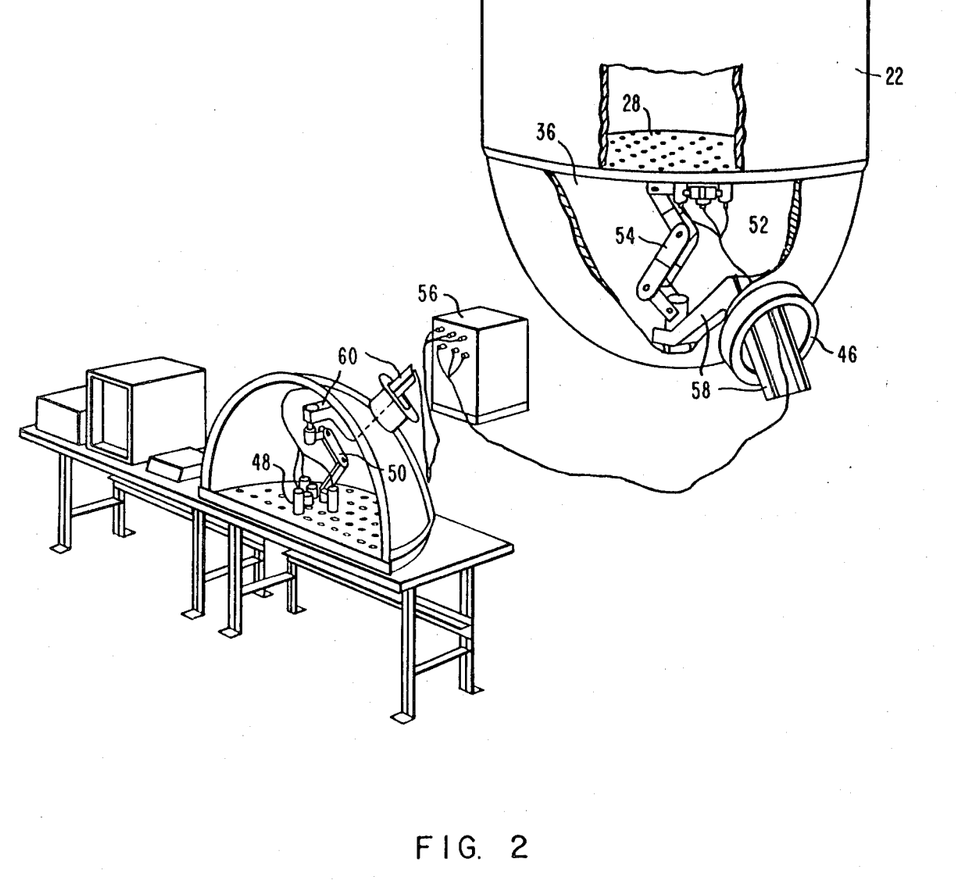
FIG. 2 is a diagram showing the slave carriage and slave manipulator arm in a plenum of a steam generator along with the master carriage and master manipulator arm in an inverted scale model of a steam generator.

Referring now to FIG. 2, the remote access manipulator comprises a master carriage 48, master manipulator arm 50, slave carriage 52, and slave manipulator arm 54. Master carriage 48 and master manipulator arm 50 are located in a scale model of the equipment on which operations are to be performed such as a scale model of a steam generator while slave carriage 52 and slave manipulator arm 54 are located in the actual steam generator 20. Master carriage 48 and master manipulator arm 50 are connected by cables to control box 56 which is also connected to slave carriage 52 and slave manipulator arm 54. Slave manipulator arm 54 is movably mounted on slave track 58 which extends through manway 46 and into approximately the center of primary outlet plenum 36 such that slave manipulator arm 54 may be advanced into and out of steam generator 20 along slave track 58. Likewise, master manipulator arm 50 is movably mounted on master track 60 which extends through the scale model of the manway and into the scale model of the steam generator. The controls of the remote access manipulator are such that the scale model of the steam generator along with master carriage 48 and master manipulator arm 50 are located remote from the actual steam generator thereby eliminating the radiological problems associated with personnel access. Working personnel may then manually move master carriage 48 and master manipulator arm 50 to a desired location while slave carriage 52 and slave manipulator arm perform the same movement in the actual steam generator. In this manner, operations may be performed on the actual steam generator with greatly reduced personnel radiation exposure.

Figure 3:
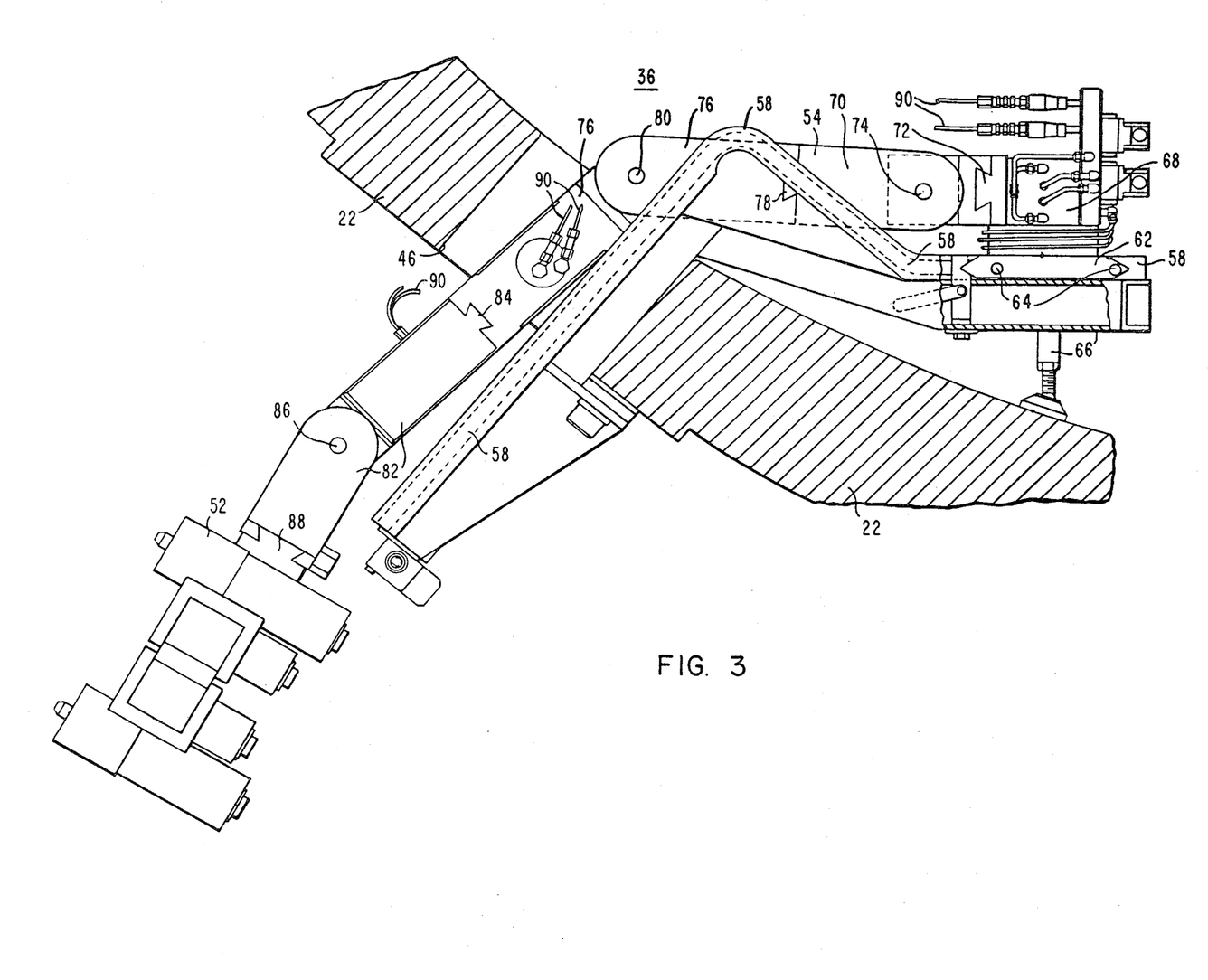
FIG. 3 is a partial cross-sectional view in elevation of a manipulator arm and carriage extending through a manway of a steam generator.
Figure 4:
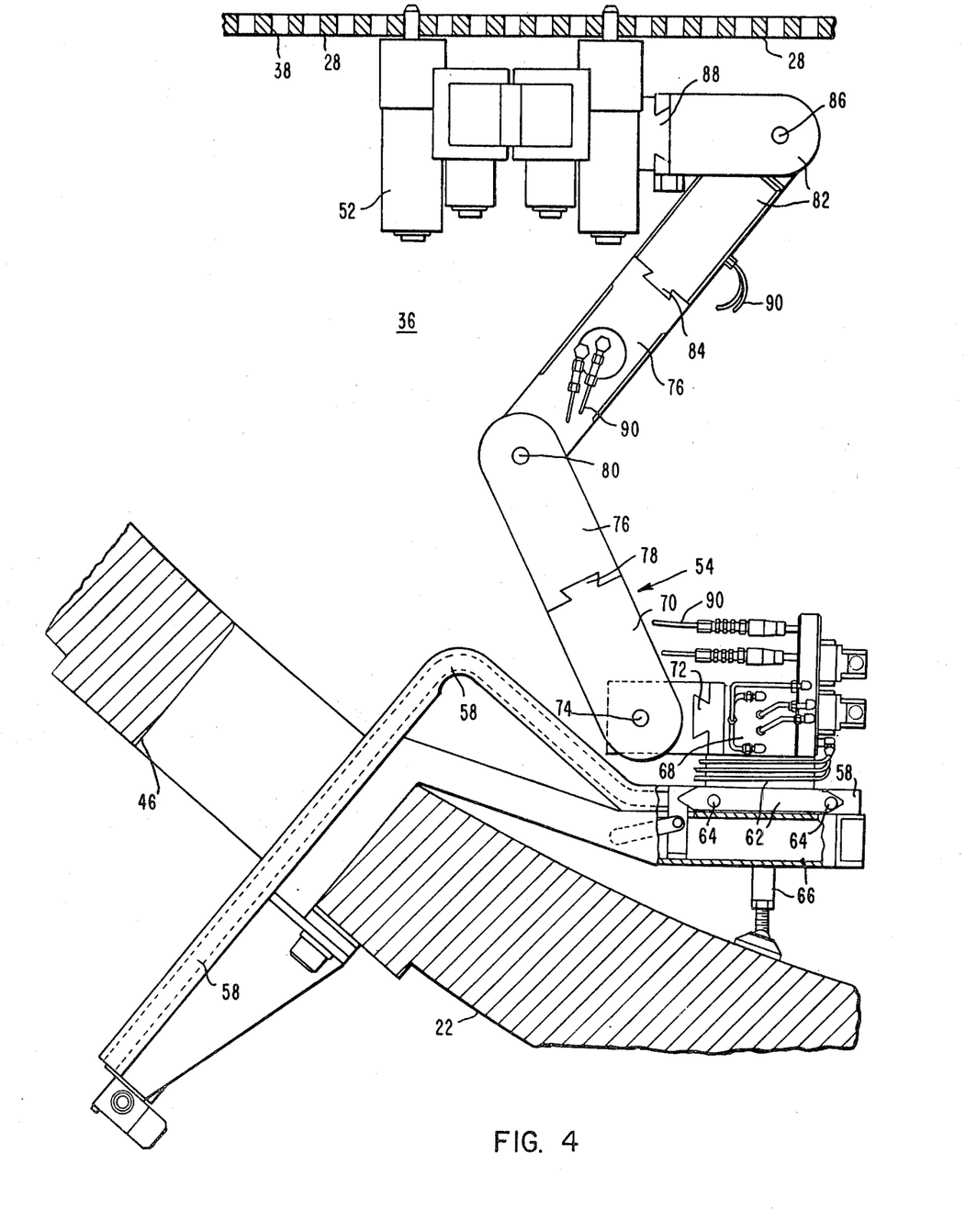
FIG. 4 is a partial cross-sectional view in elevation of the slave manipulator arm and slave carriage in a plenum of a steam generator.
Figure 5:
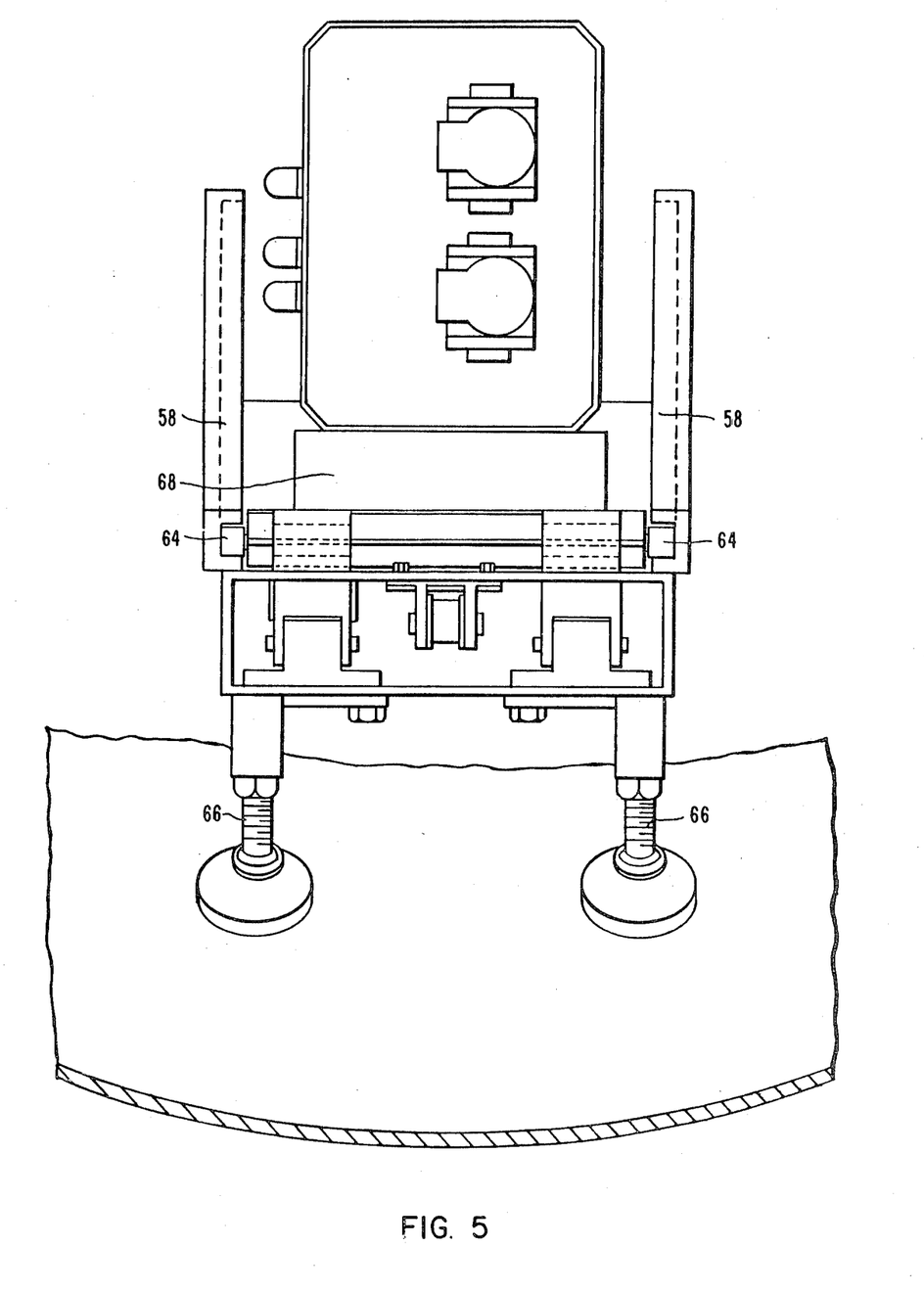
FIG. 5 is an end view of a manipulator arm and track.

Referring to FIGS. 3-5, slave manipulator arm 54 is shown extended through mamnway 46 with slave carriage 52 attached to the end thereof. It should be noted that while only slave carriage 52 and slave manipulator arm 54 are shown in FIG. 3, FIG. 3 also represents master carriage 48 and master manipulator arm 50 since they are substantially similar. Slave manipulator arm 54 comprises a base 62 having cam rollers 64 attached thereto. Cam rollers 64 are disposed in track 58 along with a chain (not shown) so that base 62 may be advanced along track 58 by advancing the chain in the desired direction. Track 58 is supported from the bottom of the steam generator by stand 66.

First segment 68 is rotatably mounted on base 62 such that first segment 68 may rotate about a vertical axis through base 62. Base 62 contains a potentiometer chosen from those well known in the art that senses the angle of rotation between first segment 68 and base 62. First segment 68 is connected to second segment 70 by a first dovetail joint 72 so that the segment may be easily assembled or disassembled. Second segment 70 has a first rotatable joint 74 which allows a portion of second segment 70 to rotate about a horizontal axis through first rotatable joint 74. Similarly, third segment 76 is attached to second segment 70 by second dovetail joint 78 and has a second rotatable joint 80 similar to first rotatable joint 74. Likewise, fourth segment 82 is attached to third segment 76 by third dovetail joint 84 and has a third rotatable joint 86 similar to first rotatable joint 74. Fourth segment 82 also has a remotely actuated gripper mechanism or a fourth dovetail joint 88 which allows the manipulator arm to be attached to the carriage or tools. First rotatable joint 74, second rotatable joint 80, third rotatable joint 86 and the rotatable joint between base 62 and first segment 68 of the slave manipulator arm 54 may be powered by hydraulic vane-type rotary actuators with integral potentiometers to sense the angle of rotation. Hydraulic rotary actuators may be chosen because of their lightweight characteristic which increases the maneuverability of the slave manipulator arm 54. Of course, flexible conduits 90 are provided to conduct the hydraulic fluid from a fluid source to the rotary vane actuators under control from control box 56. Since the master manipulator arm 50 is powered manually there is no need for rotary actuators in the master manipulator joints. However, potentiometers similar to those in the slave manipulator arm 54 are present in the master manipulator arm 50. Manual movement of the master manipulator arm 50 by the working personnel is sensed by the potentiometers therein and relayed to a servo control module located in control box 56 which may be chosen from those well known in the art such as a servo control module from Moog Incorporated which sends a command signal to the slave manipulator arm 54 rotary actuators that causes the rotary actuators to move in a direction to eliminate the difference in reading between the potentiometers of the master and slave manipulator arms. Such signals thereby cause the slave manipulator arm to replicate the movement of the master manipulator arm. Accordingly, by properly moving the master manipulator arm with master carriage attached, the slave manipulator arm with attached slave carriage can be made to move the slave carriage 52 from outside the steam generator to attachment with tube sheet 28 of the steam generator as shown in FIGS. 3 and 4. It should be noted that for ease of operator control, the master carriage, master manipulator arm, scale model, and corresponding controls may be arranged inversely to the slave arrangement thereby allowing the operator to more easily view the master scale model. In addition, closed circuit television may be provided as an auxiliary check on the location of the slave apparatus and to provide assistance during docking operations.

Figure 6:
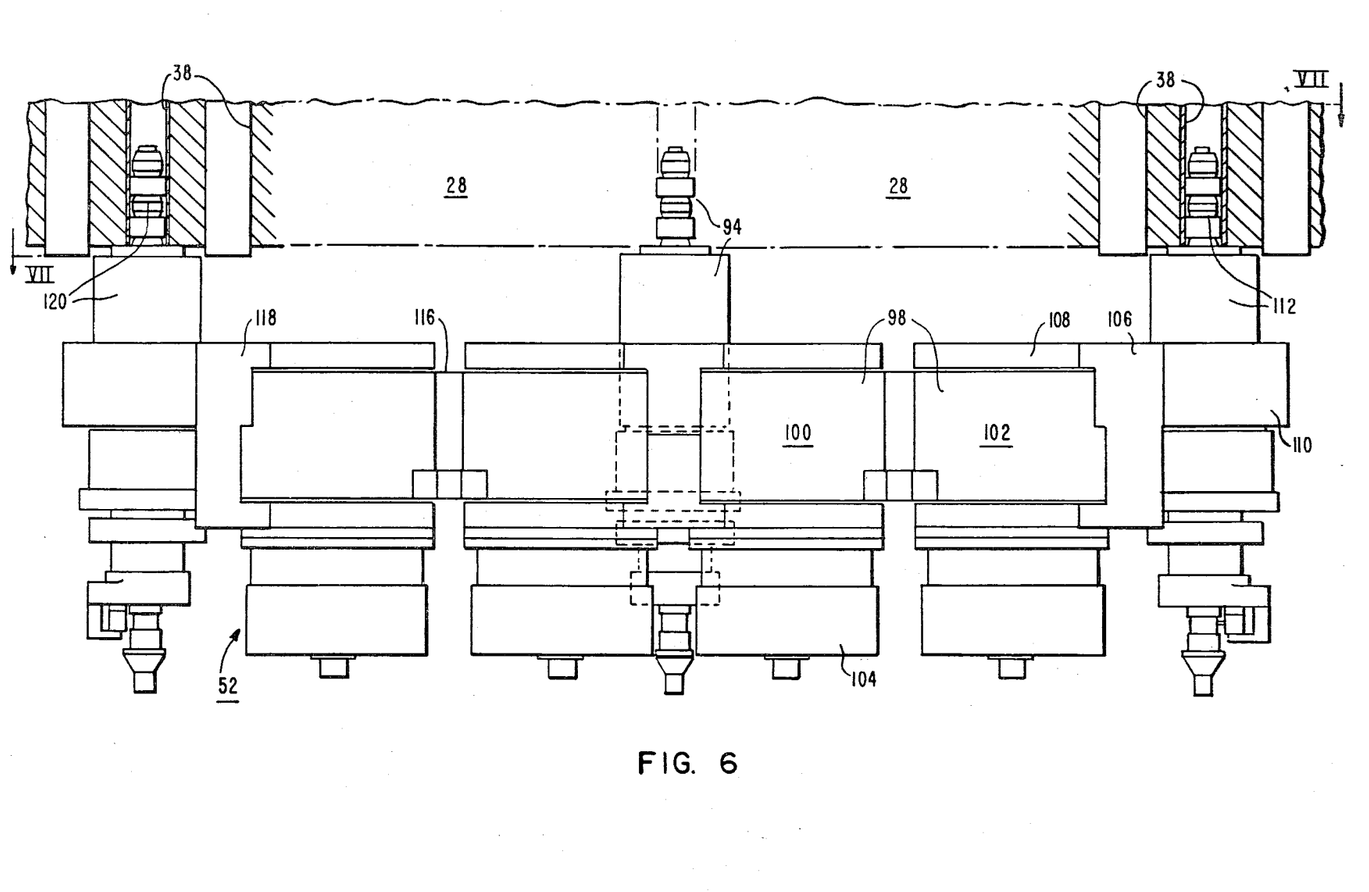
FIG. 6 is a partial cross-sectional view in elevation of a tube sheet and slave carriage.
Figure 7:
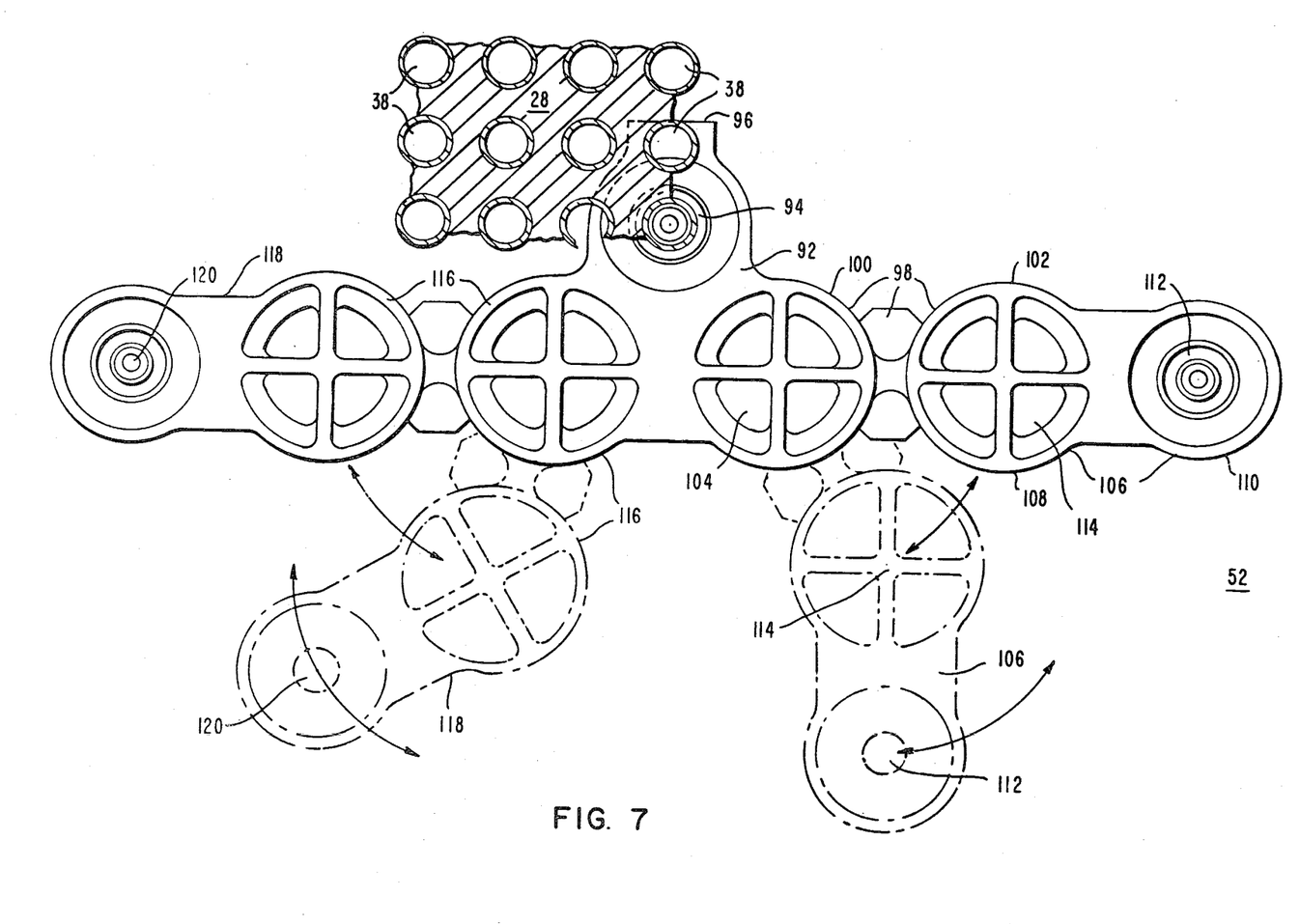
FIG. 7 is a plan view of a slave carriage and tube sheet.

FIGS. 6 and 7 illustrate slave carriage 52 in its engagement with a tube sheet 28. While only slave carriage 52 is shown, it is to be understood that master carriage 48 is similar to it. The main difference between slave carriage 52 and master carriage 48 lies in the fact that master carriage 48 is manually movable while slave carriage 52 mechanically replicates the manual movements of master carriage 48. As can be seen in FIGS. 6 and 7, slave carriage 52 comprises a body 92 which serves as the central portion of the carriage. Body 92 has a first camlock 94 which is capable of engaging the interor of a tube 38 of tube sheet 28 for suspending slave carriage 52 beneath tube sheet 28. Body 92 also has an end effector attachment 96 on the end thereof for holding tools for inspecting or repairing tube sheet 28 or tubes 38. End effector attachment 96 may be a dovetail joint or other gripper device that is capable of firmly engaging a work tool. When an end effector such as a work tool has been attached to end effector attachment 96 by slave manipulator arm 54, slave carriage 52 is capable of traversing tube sheet 28 for positioning the end effector at an appropriate location under the control of master carriage 48 and master manipulator arm 50.

Still referring to FIGS. 6 and 7, body 92 has a first housing 98 rotatably attached thereto. First housing 98 has a first end 100 which is rotatably disposed within body 92 and a second end 102 that extends outwardly from body 92. A first motor 104 is located within first end 100 and provides first housing 98 with the capability of rotating with respect to body 92. First end 100 also has angle sensing potentiometer disposed therein for determining the angle of rotation of first housing 98 with respect to body 92. Master carriage 48 similarly has an angle sensing potentiometer that senses its angle. Of course, master carriage 48 does not have motors therein because it is manually operated. Manual movement of master carriage 48 is sensed by its potentiometer and relayed to control box 56. A servo control module such as one from Moog Incorporated and located in control box 56 determines if there is a difference between the reading of the potentiometers in the slave carriage and master carriage and commands the slave carriage motors to rotate until there is no difference in potentiometer readings. Thus, manual movement of master carriage 48 is translated into mechanical movement of slave carrige 52.

A second housing 106 has a first portion 108 similarly rotatably disposed around second end 102 of first housing 98 and a second portion 110 extending outwardly from first portion 108. Second portion 110 has a second camlock 112 attached thereto which is similar to first camlock 94. Second housing 106 also has a second motor 114 disposed within first portion 108 that provides second housing 106 with the capability of rotating with respect to first housing 98. Another angle sensing potentiometer is located in second housing 106 for detecting its angle of rotation in a manner similar to the potentiometer of first housing 98. Likewise, a third housing 116 and a fourth housing 118 are connected to body 92 on a side opposite first housing 98 and second housing 106. Third housing 116 may be identical to first housing 98 while fourth housing 118 may be identical to second housing 106 with fourth housing 118 having a third camlock 120 disposed therein.

As is illustrated in FIG. 7, both master carriage 48 and slave carriage 52 are capable of placing the camlocks in numerous locations which allows the slave carriage 52 to be able to traverse tube sheet 28 in an unlimited number of directions. The carriages are also capable of traversing a tube sheet 28 with an irregular tube hole configuration or an uneven tube sheet surface. As described previously, movement of the housings is accomplished by manual manipulation of master carriage 48 which is translated into mechanical movement of slave carriage 52. Similarly, insertion and withdrawal of the camlocks of master carriage 48 is manually accomplished and translated by electronic relays and sensing devices into mechanical movement of the slave carriage camlocks. The operation of slave carriage 52 is such that only one camlock is withdrawn while the other two camlocks remain engaged in tube sheet 28. With the one camlock withdrawn, the manipulation of the master carriage can position the withdrawn camlock in a new position. When in the new position the camlock can be inserted in a tube 38 and another camlock withdrawn and repositioned. In this manner, the slave carriage can be made to traverse the entire tube sheet 28. Moreover, with all three camlocks locked into tube sheet 28 body 92 is capable of rotating about first camlock 94 so as to position end effector attachment 96 with a tool attached thereto in a number of different locations. Such movements of slave carriage 52 serve to position an end effector such as a work tool in appropriate locations to perform operations on the sheet 28.

Referring now to FIGS. 8–13, one of the camlocks of slave carriage 52 is shown in the withdrawn position. The camlock comprises an outer housing 122 with bearings 124 which mounts inner housing 126 within outer housing 122 in a rotatable manner. Of course, outer housing 122 corresponds to any of body 92, second housing 106, or fourth housing 118 wherein there is disposed a camlock. Bearings 124 enable outer housing 122 to rotate about the camlock even though the camlock has been inserted in a tube 38. A central member 128 is disposed within inner housing 126 but is not fixedly attached thereto. A cup member 130 is attached to the top portion of central member 128 so as to form a step 132 that allows cup member 130 to rest on inner housing 126 at step 132. Since central member 128 is attached to cup member 130, the weight of central member 128 is also transmitted to inner housing 126 by means of step 132. It should be noted that cup member 130 is not attached to inner housing 126 at step 132 but merely rests thereon at step 132 and is capable of relative motion at that interface. Cup member 130 acts to contact tubes 38 so as to determine the location of the carriage with respect to the tube sheet 28.

Figure 8:
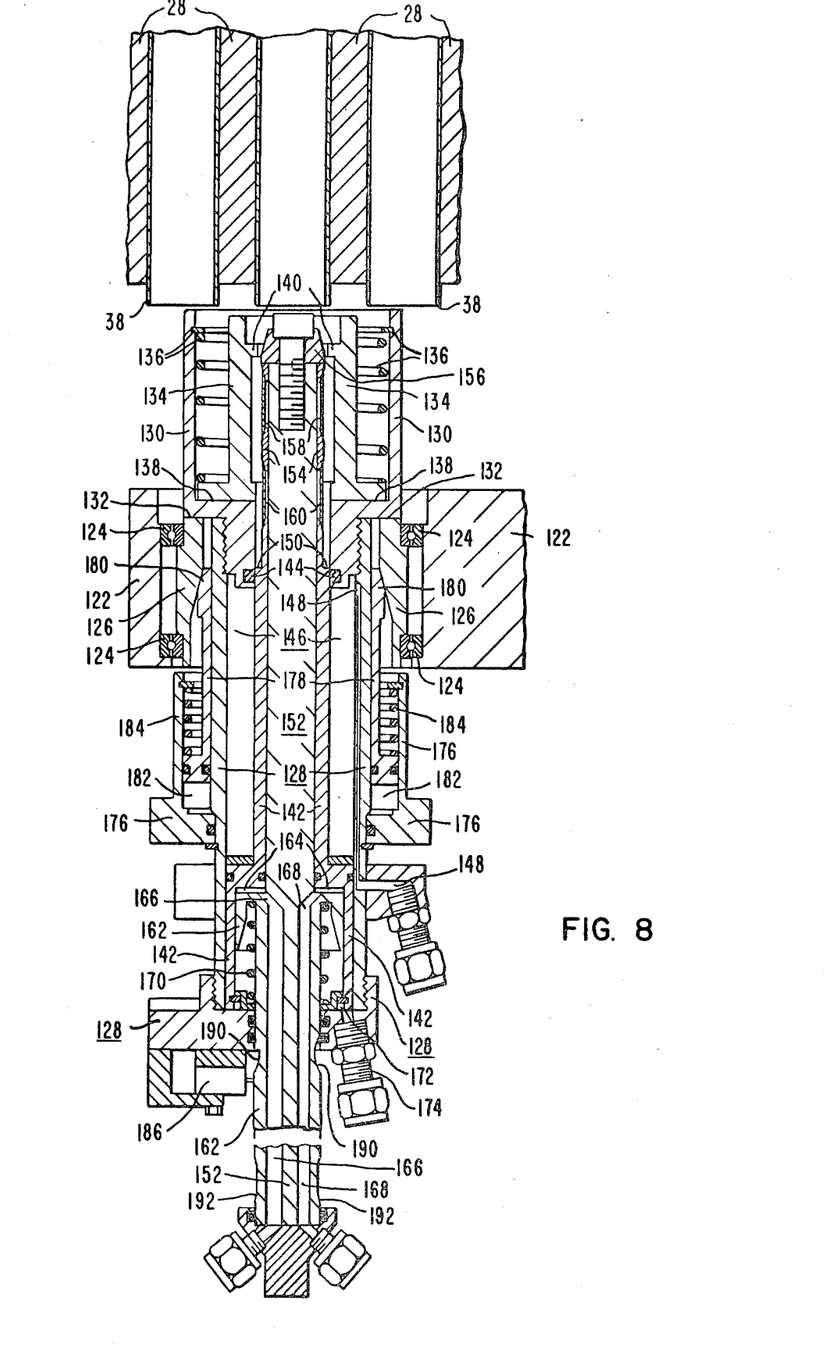
FIG. 8 is a cross-sectional view in elevation of a camlock in the withdrawn position.
Figure 9:
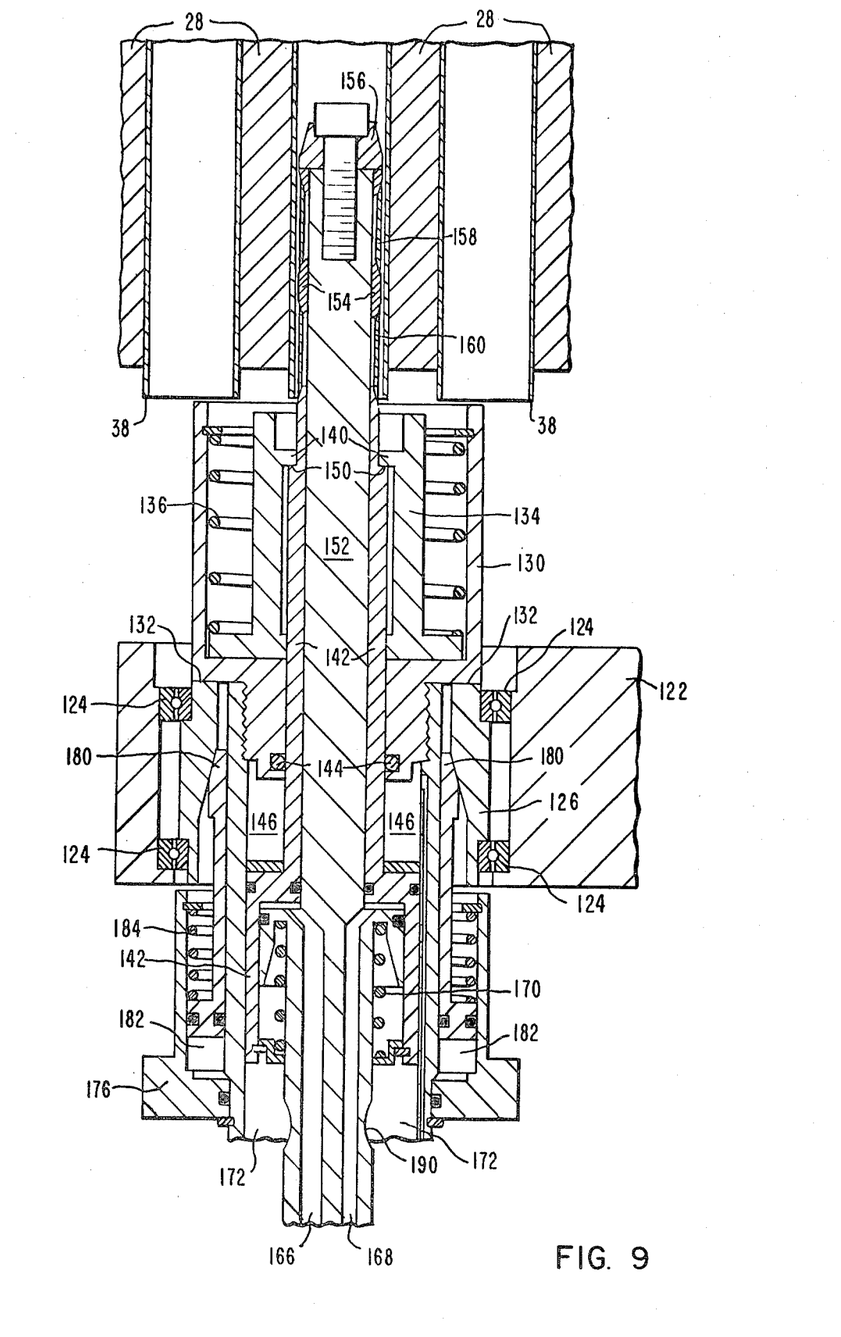
FIG. 9 is a cross-sectional view in elevation of a camlock in the inserted unlocked position.
Figure 10:
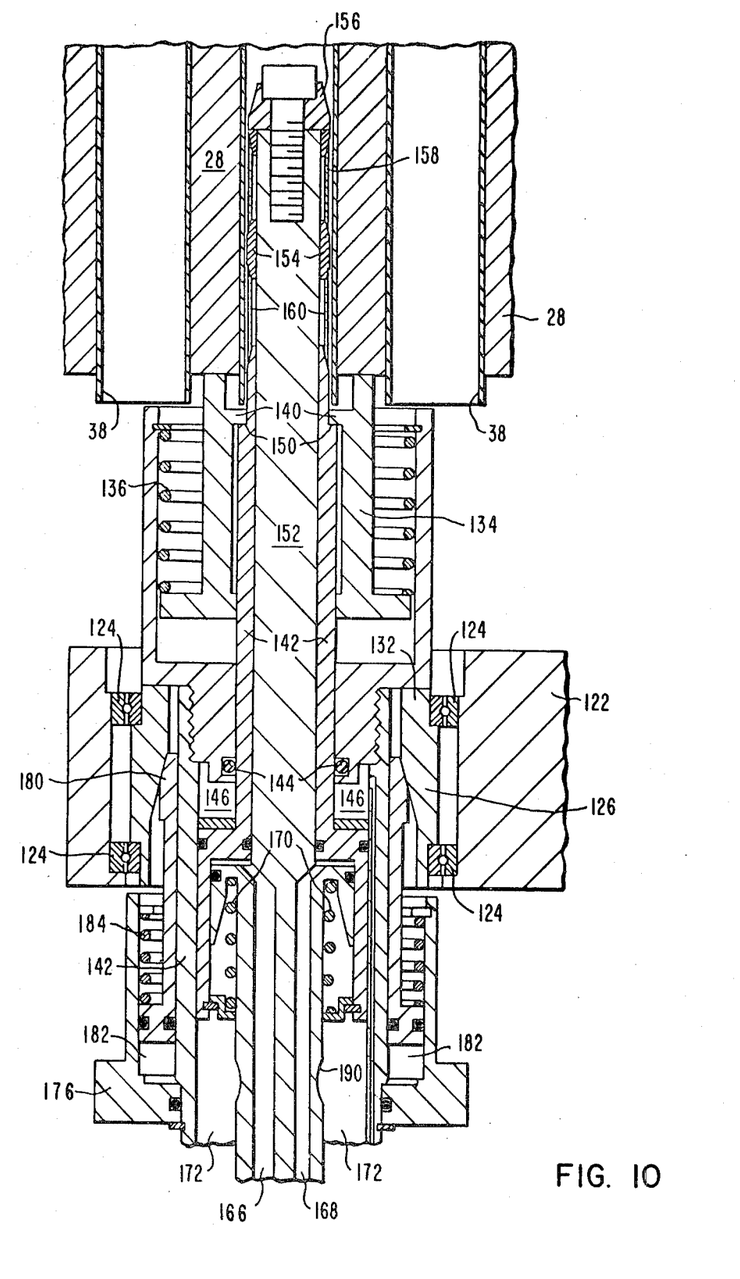
FIG. 10 is a cross-sectional view in elevation of a camlock in the inserted unlocked abutting position.
Figure 11:
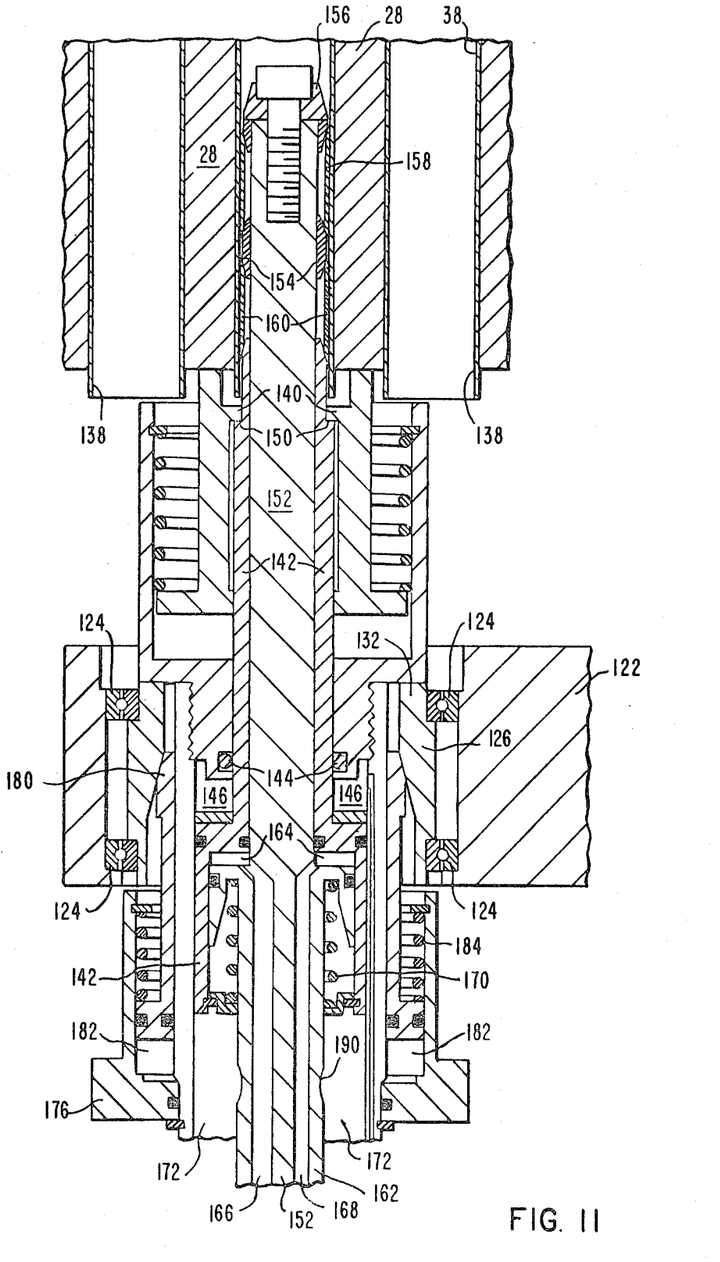
FIG. 11 is a cross-sectional view in elevation of a camlock in the inserted locked position.
Figure 12:
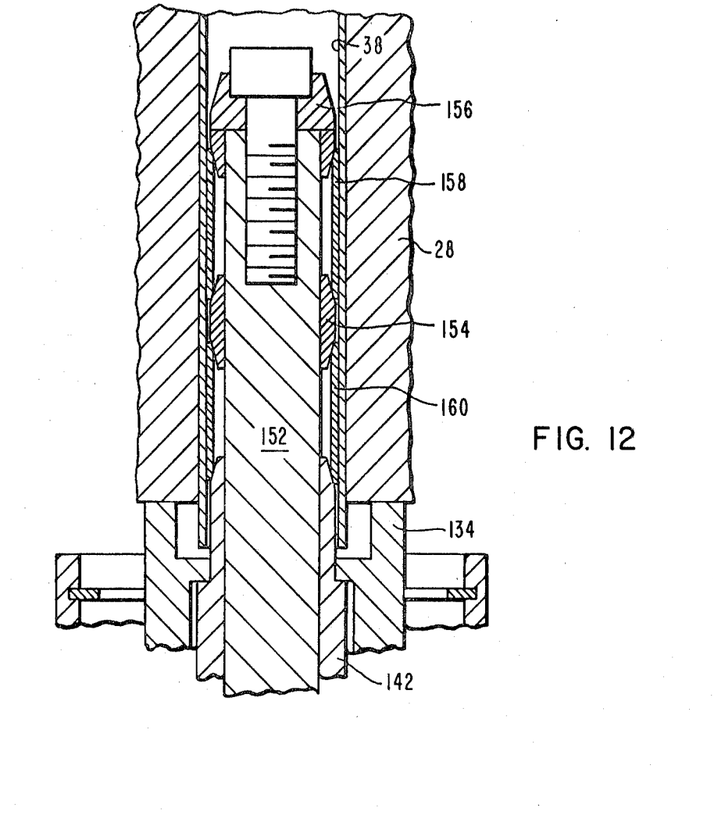
FIG. 12 is an enlarged cross-sectional view in elevation of a camlock in the inserted locked position.

Still referring to FIGS. 8–13, a first slider member 134 is disposed within cup member 130 and is capable of relative motion with respect to cup member 130. A first biasing mechanism 136 which may be a coil spring with a stop is arranged between cup member 130 and first slider member 134 so as to urge first slider member 134 against cup member 130 along first interface 138. In addition, first slider member 134 has a first ledge 140 for engaging members disposed therein. A second slider member 142 is slidably disposed partially within cup member 130 and within central member 128. A sliding seal 144 which may be an O-ring is located between cup member 130 and second slider member 142 for sealing the members together while allowing relative motion therebetween. Second slider member 142, cup member 130, and central member 128 define a first annular chamber 146 for accommodating a fluid such as air for forcing second slider member 142 downwardly with respect to cup member 130. A first channel 148 is provided in fluid communication with first annular chamber 146 for introducing a fluid thereinto. Second slider member 142 also has a second ledge 150 for engaging first ledge 140 of first slider member 134 that causes first slider member 134 to contact tube sheet 28 as shown in FIG. 10. A third slider member 152 is disposed within second slider member 142 and is capable of sliding relative thereto. A spacer 154 is attached to the top portion of third slider member 152 and a cap 156 is attached to the top end of third slider member 152. A first metal ring 158 is disposed around third slider member 152 and between cap 156 and spacer 154 while a second metal ring 160 is located around third slider member 152 and between spacer 154 and second slider member 142. First metal ring 158 and second metal ring 160 generally fit loosely around third slider member 152 and may have a slot therein or they may have a plurality of slots that extend substantially the length of the ring for accommodating radial expansion. However, when third slider member 152 is drawn downwardly relative to second slider member 142, the beveled edges of cap 156, spacer 154, and second slider member 142 cause both first metal ring 158 and second metal ring 160 to expand. At this point, third slider member 152 will be disposed within a tube 38 so that the expansion of the metal rings 158 and 160 will cause the rings to contact the interior of a tube 38 thus locking the camlock in place as shown in FIGS. 10–12.

Again referring to FIGS. 8–13, a fourth slider member 162 which may be an integral portion of third slider member 152 (as shown in the drawings) or a separate member attached to third slider member 152 is slidably disposed within second slider member 142 and central member 128. Fourth slider member 162, second slider member 142, and third slider member 152 define a second annular chamber 164 for accommodating a fluid such as oil for forcing third slider member 152 downwardly with respect to second slider member 142 which initiates the expansion of rings 158 and 160. A second channel 166 is provided in fourth slider member 162 for introducing the fluid into second annular chamber 164 while a third channel 168 is provided for removing the fluid therefrom. Of course, both second channel 166 and third channel 168 may be used simultaneously to introduce the fluid into second annular chamber 164. Generally, second channel 166 is larger in diameter than third channel 168 so that gases that may be present in second annular chamber 164 may be bled off through third channel 168 while the oil is introduced through second channel 166. In addition, a second biasing mechanism 170 which may be a coil spring is arranged between second slider member 142 and fourth slider member 162 for urging fourth slider member 162 against second slider member 142 thereby tending to close second annular chamber 164. Furthermore, a third annular chamber 172 is defined between the bottom of second slider member 142 and central member 128 for accommodating a fluid such as air for forcing second slider member 142 upwardly toward tube sheet 28 which also causes slider member 152 and fourth slider member 162 to be moved upwardly. The fluid may be introduced into third annular chamber 172 through a fourth channel 174 which may also serve to remove the fluid therefrom. It is to be observed that it is the action of introducing a fluid such as air into third annular chamber 172 that causes third slider member 152 to be inserted into a tube 38 of tube sheet 28. Likewise, it is this action which causes second slider member 142 to force first slider member 134 against tube sheet 28. When third slider member 152 has thus been inserted into a tube 38, introduction of a fluid into second annular chamber 164 causes third slider member 152 to move slightly downward relative to second slider 142 thus expanding rings 158 and 160 which causes the mechanism to be tightly locked into tube 38.

Still referring to FIG. 8, an outer member 176 is attached around central member 128 and has a fifth slider member 178 slidably disposed therein. Fifth slider member 178 has a beveled head 180 formed on the top end thereof that conforms to the curvature of inner housing 126. A fourth annular chamber 182 is defined by outer member 176, fifth slider member 178 and central member 128 for accommodating a fluid such as oil. Channel and valves (not shown) are also provided for conducting the fluid to fourth annular chamber 182. When the fluid has been introduced into fourth annular chamber 182, fifth slider member 178 is forced upwardly against inner housing 126. This procedure is normally performed when third slider member 152 has been locked in a tube 38 in which case the contact of fifth slider member 178 against inner housing 126 will cause inner housing 126 to become aligned with third slider member 152 thus aligning the camlock with the particular tube 38. A third biasing mechanism 184 which may be a coil spring is arranged between outer member 176 and fifth slider member 178 so as to urge fifth slider member 178 downwardly. When the fluid pressure is released from fourth annular chamber 182, third biasing mechanism 184 causes fifth slider member 17 to move downwardly with respect to outer member 176.

Figure 13:
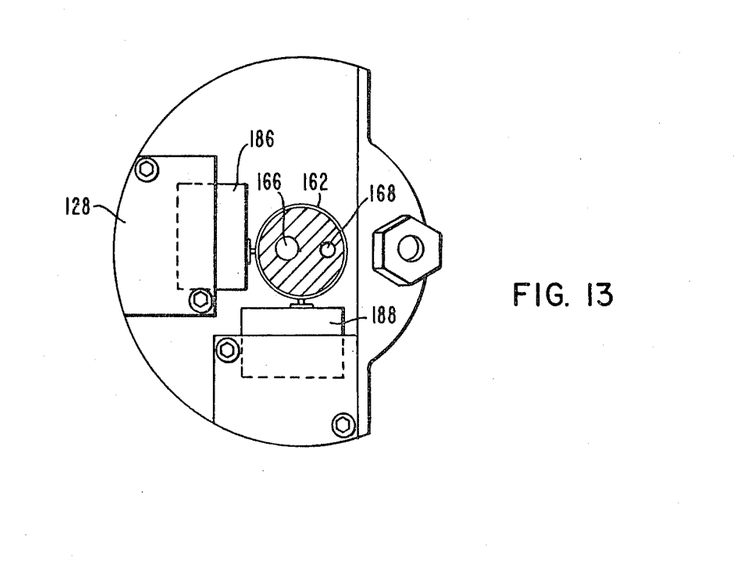
FIG. 13 is a bottom end view of a camlock.

Referring now to FIGS. 8 and 13, a first sensor 186 is attached to central member 128 so as to be able to contact fourth slider member 162. A second sensor 188 is also attached to central member 128 but at ninety degrees around fourth slider member 162. When fourth slider member 162 is in the down position first sensor 186 contacts the normal diameter of fourth slider member 162 as shown in FIG. 8 while second sensor 188 is contacting first notch 190 in fourth slider member 162. However, when fourth slider member 162 is moved upwardly a short distance first sensor 186 will still contact the normal diameter of fourth slider member 162 as will second sensor 188 rather than first notch 190. When fourth slider member 162 is fully inserted, first sensor 186 will contact second notch 192 while second sensor 188 will still contact the normal diameter of fourth slider member 162. Thus, the sensors together can determine if fourth slider member 162 is fully down, partially inserted or fully inserted. The controls for the camlocks may be chosen from those well known in the art such as a rotary stepping switch from C. P. Clare and Co. of Chicago, Ill. and may be located in control box 56.

OPERATION

When it is desired to inspect or repair a nuclear steam generator, the steam generator primary fluid inlet and outlet plena are drained and a manway is opened giving access to one of the plena. The slave track 58 is then introduced through manway 46 and bolted into place. Slave manipulator arm 58 is then assembled on the portion of track 58 that extends out of steam generator 20. Next slave manipulator arm 58 is cranked into the steam generator along track 58 by means of a chain. At this point the master manipulator arm 50 is coordinated wih slave manipulator arm 54 so that the position of master manipulator arm 50 on the scale model corresponds to the position of slave manipulator arm 54 in steam generator 20. Of course, the scale model is positioned upside down with respect to the steam generator as shown in FIG. 2 so that the operator may have better access to the scale model. Master manipulator arm 50 is then manually moved by the operator into any desired position which results in slave manipulator arm 54 being similarly positioned. Next, master carriage 48 is attached to master manipulator arm 50 and slave carriage 52 is attached to slave manipulator arm 54 as shown in FIG. 3. Master manipulator arm 50 is then moved so that master carriage 48 is plugged into the scale model of the tube sheet which results in slave manipulator arm 54 and slave carriage 52 attaining the position as indicated in FIG. 4. The camlocks of master carriage 48 are then manually locked into the scale model of the tube sheet which causes the camlocks of slave carriage 52 to also become locked into the tube sheet 28. At this point, the manipulator arms (both the master and the slave) are disconnected from the end effector attachment 96, and are extended outwardly through manway 46 where a chosen tool is attached to the end of slave manipulator arm 54 such as fourth dovetail joint 88 while a scale model of the tool is attached to master manipulator arm 50. The slave manipulator arm 54 is then caused to attach the tool to end effector attachment 96 and release the tool from fourth dovetail joint 88. In so doing, a tool is mechanically handed through manway 46 to slave carriage 52 without operator exposure to the irradiated interior of steam generator 20. In this position, slave carriage 52 may then traverse tube sheet 28 so as to place the tool on end effector attachment 96 in proper relationship with a chosen location of tube sheet 28. At this point all camlocks are in a locked position as shown in FIG. 11 but with first annular chamber 146 closed.

In order to traverse tube sheet 28 it is necessary to withdraw one camlock as shown in FIG. 8 so that the withdrawn camlock can be moved as indicated in FIG. 7. Because of the rotatability of the members of slave carriage 52 any camlock may be withdrawn and moved as long as the other two camlocks are locked in place thus suspending slave carriage 52 from tube sheet 28. The camlock of master carriage 48 that has been withdrawn is then positioned over the selected tube and manually inerted, this causes the corresponding slave camlock to function as follows.

Referring to FIGS. 8 and 9, air is introduced into third annular chamber 172 which causes second slider member 142, third slider member 152, and fourth slider member 162 to move upwardly toward tube sheet 28 as shown in FIG. 9. As second slider member 142 moves upwardly second ledge 150 contacts first ledge 140 which causes first slider member 134 to contact tube sheet 28 around the chosen tube 38 as shown in FIG. 10. In this position, third slider member 152 has been inserted into tube 38. Then oil is introduced under pressure into second annular chamber 164 which forces fourth slider member 162 downwardly with respect to second slider member 142. Since third slider member 152 is attached to fourth slider member 162, third slider member 152 is also forced downwardly with respect to tube sheet 28 and second slider member 142. The downward motion of third slider member 152 causes the beveled edges of cap 156 and spacer 154 to contact first metal ring 158 and second metal ring 160 thereby causing the rings to expand and contact the inner side of tube 38 thus locking itself in place as shown in FIGS. 11 and 12. Withdrawal of a camlock may be done by reversing this procedure.

Since each tube 38 may have a slightly different alignment with respect to other such tubes 38, it is desirable to be able to align each camlock with the tube 38 in which it is to be inserted. Thus, cup member 130 is arranged to rest relatively loosely on inner housing 126 at step 132 so that as the appropriate sliders are introduced into a tube 38, the sliders may align themselves with the tube into which they are being inserted without being constricted by inner housing 126 or the remainder of the carriage. Once the sliders have thus been aligned and locked into the chosen tube 38, it is then desirable to align inner housing 126 and that portion of the carriage with the chosen tube. To thus align inner housing 126 and the carriage, oil is introduced into fourth annular chamber 182 which forces beveled head 180 against inner housing 126. The beveled sides of beveled head 180 together with the corresponding sides of inner housing 126 causes inner housing 126 to shift into alignment with third slider member 152 which is in alignment with tube 38 into which it has been inserted. Of course, third biasing mechanism 184 will return fifth slider member 178 to its lowered position upon release of the oil from fourth annular chamber 182. In this manner any camlock may be locked into any open tube 38. By moving one camlock at a time as described above and then another camlock in the same manner, slave carriage 52 can be made to traverse the entire tube sheet 28. Furthermore, the rotatability of the joints of slave carriage 52 enables slave carriage 52 to move in any direction and enables it to skip a tube 38 that may be plugged. Such movements of slave carriage 52 are used to position tools that have been attached to end effector attachment 96 so that operations may be performed in the steam generator.

Because there exists a certain amount of slack or looseness among the members of slave carriage 52 and because slave carriage 52 is suspended beneath tube sheet 28, gravity tends to cause the members of slave carriage 52 to sag in relationship to tube sheet 28. As slave carriage 52 traverses the tube sheet this sagging of the members could accumulate to the point where the camlocks of slave carriage 52 would no longer be able to engage a tube 38 which would result in the carriage falling from the tube sheet. To avoid this problem it is advisable to have a mechanism whereby the sag of slave carriage 52 is eliminated after each move thus maintaining the carriage at a constant distance from tube sheet 28. The invention described herein is capable of eliminating this problem. With two camlocks locked in place, the third camlock is withdrawn and moved to a new position. At this point, air is introduced into third annular chamber 172 of the third camlock which causes third slider member 152 to be inserted as prevously described. Then the air is released from third annular chamber 172 of both of the other camlocks while air is introduced into both first annular chambers 146 of these two camlocks. Since the oil pressure in the second annular chambers 164 of both of these camlocks is greater than the air pressure in their first annular chambers 146 and since the friction force on rings 158 and 160 is sufficient to hold third slider member 152 in place, the introduction of air into first annular chambers 142 causes central member 128 to be raised rather than third slider member 152 to be withdrawn. The raising of central member 128 also causes inner housing 126 and outer housing 122 to be raised relative to tube sheet 28. Since this is occurring on the two locked camlocks the effect is to raise slave carriage 52 relative to tube sheet 28. Next, oil is introduced into second annular chamber 164 to lock it in place. Then air is introduced into third annular chamber 172 of all three camlocks which causes central member 128 to be moved downwardly with respect to third slider member 152 which causes the bottom portion of cup member 130 to contact second slider member 142 thus eliminating first annular chamber 146. In this manner, the cumulative sag among members is avoided. Therefore, the invention provides a remote access manipulator having a self-aligning camlock for performing operations on equipment located in areas where human access is limited.

I claim as my invention:

1. A remote access manipulator for performing operations on equipment including a slave carriage engageable with said equipment by means of camlocks for positioning instruments in relationship to said equipment, a slave manipulator arm located near said slave carriage for positioning said slave carriage and for transferring said instruments to said slave carriage, a master carriage similarly attached to a scale model of said equipment located remote from said equipment whereby manual manipulation of said master carriage is automatically replicated by said slave carriage, a master manipulator arm located near said master carriage for controlling said slave manipulator arm whereby manual manipulation of said master manipulator arm is automatically replicated by said slave manipulator arm, and control means for coordinating movement between said carriages and said arms, each of said camlocks comprising:

bearings mounted on said slave carriage;
an inner housing rotatably mounted on said bearings;
a central member disposed within said inner housing and having a cup member attached to the top portion thereof so as to form a step that allows said cup member to rest on said inner housing;
a first slider member disposed within said cup member and capable of relative motion with respect to said cup member and a first biasing means arranged between said first slider member and said cup member for urging said first slider member against said cup member;
a second slider member slidably disposed within said cup member and said central member and capable of contacting said first slider member, said cup member, second slider member and said central member defining a first annular chamber therebetween for accommodating a first fluid for forcing said second slider member downwardly with respect to said cup member;
a third slider member disposed within said second slider member capable of sliding relative to said second slider member and having a contact mechanism formed near the top end thereof;
a fourth slider member being an integral portion of said third slider member slidably disposed within said second slider member and said central member with said fourth slider member, said second slider member, and said third slider member defining a second annular chamber for accommodating a second fluid for forcing said third slider member downwardly with respect to said second slider member thereby causing said contact mechanism to contact said equipment and to support said remote access manipulator therefrom;
a second biasing means arranged between said second slider member and said fourth slider member for urging said fourth slider member against said second slider member thereby tending to close said second annular chamber;
said second slider member and said central member defining a third annular chamber between the bottom of said second slider member and central member for accommodating a third fluid for forcing said second slider member upwardly toward said equipment thereby causing said third slider member and said fourth slider member to be moved upwardly;
an outer member disposed around said central member with a fifth slider member slidably disposed therebetween and defining a fourth annular chamber therebetween for accommodating a fourth fluid for forcing said fifth slider member upwardly against said inner housing thereby causing said inner housing to become aligned with said third slider member thus causing said slave carriage to become properly positioned with respect to said equipment; and third biasing means arranged between said outer member and said fifth slider member for urging said fifth slider member downwardly.

2. The remote access manipulator according to claim 1 wherein said contact mechanism comprises:
a spacer attached to the top portion of said third slider member with a cap attached to the top end of said third slider member;
a first metal ring disposed around said third slider member between said cap and said spacer; and
a second metal ring disposed around said third slider member and between said spacer and said second slider member, said cap, said spacer, and said second slider member causing said first metal ring and said second metal ring to expand into contact with said equipment when said third slider member is drawn downwardly.

3. The remote access manipulator according to claim 1 wherein said camlocks further comprise:
a first sensor attached to said central member and extending into contact with said fourth slider member; and
a second sensor attached to said central member at a location ninety degrees to said first sensor, said first and second sensors being capable of determining the vertical location of said fourth slider member with respect to said central member.

4. The remote access manipulator according to claim 1 wherein said first fluid is air.

5. The remote access manipulator according to claim 1 wherein said second fluid is oil.

6. The remote access manipulator according to claim 1 wherein said third fluid is air.

7. The remote access manipulator according to claim 1 wherein said fourth fluid is oil.

8. The remote access manipulator according to claim 1 wherein said first metal ring and said second metal ing have slots therein for accommodating expansion.

9. The remote access manipulator according to claim 1 wherein said slave carriage comprises:
a body having a first said camlock disposed therein for engaging said equipment and having an end effector attachment for engaging said instruments;
a first housing having a first end rotatably attached to said body and having a second end extending outwardly from said body;
a first drive means disposed within said first end of said first housing for rotating said first housing with respect to said body;
a second housing having a first portion rotatably attached to said second end of said first housing and having a second portion extending outwardly from said first portion;
a second drive means disposed within said first portion of said second housing for rotating said second housing with respect to said first housing;
a second said camlock disposed in said second portion of said second housing for engaging said equipment;
a third housing having a first side rotatably attached to said body and having a second side extending outwardly from said body;
a third drive means disposed within said first side of said third housing for rotating said third housing with respect to said body;
a fourth housing having a first section rotatably attached to said second side of said third housing and having a second section extending outwardly from said first section;
a fourth drive means disposed within said first section of said fourth housing for rotating said fourth housing with respect to said third housing;
a third said camlock disposed in said second section of said fourth housing for engaging said equipment; and
angle sensing means located with each of said drive means for determining the angle of rotation of each of said housings, said housings cooperating to advance said body in relationship to said equipment so as to position said instruments in proper relationship with said equipment so that operations may be performed thereon.

10. The remote access manipulator according to claim 9 wherein said slave manipulator arm comprises:
a base;
a first segment rotatably mounted on said base so that said first segment may rotate about an axis through said base;
a second segment removably attached to said first segment and having a first rotatable joint which allows a portion of said second segment to rotate with respect to the remainder of said second segment;
a third segment removably attached to said second segment and having a second rotatable joint which allows a portion of said third segment to rotate with respect to the remainder of said third segment;
a fourth segment removably attached to said third segment and having a third rotatable joint which allows a portion of said fourth segment to rotate with respect to the remainder of said fourth segment and having a gripper mechanism for engaging said end effector attachment of said main body; and
angle sensing mechanisms together with rotary actuators disposed in each of said segments and said base for controlling their movements, said segments together with said rotatable joints and said base being capable of transferring said slave carriage and being capable of transferring said instruments to said slave carriage.

11. The remote access manipulator according to claim 10 wherein said master carriage is substantially a master scale model of said slave carriage.

12. The remote access manipulator according to claim 11 wherein said master manipulator arm is substantially a master scale model of said slave manipulator arm.

13. The remote access manipulator according to claim 12 wherein said angle sensing means are potentiometers for determining the angle of rotation of said housings.

* * * * *